H. W. BOIFEUILLET.
Car Coupling.
No. 85,359.                        Patented Dec. 29, 1868.
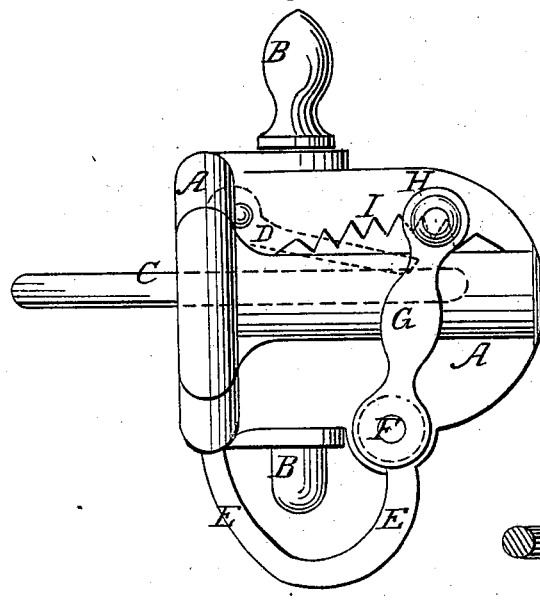
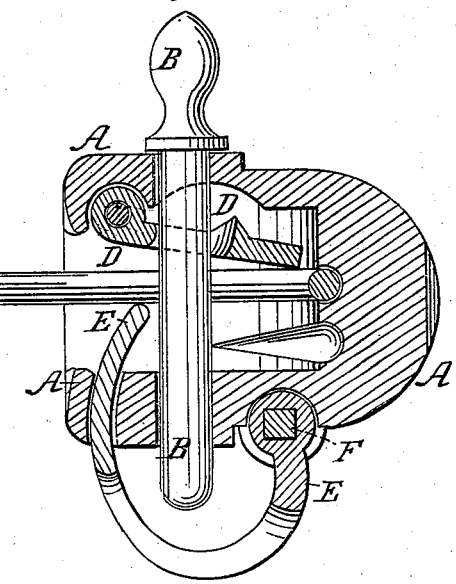
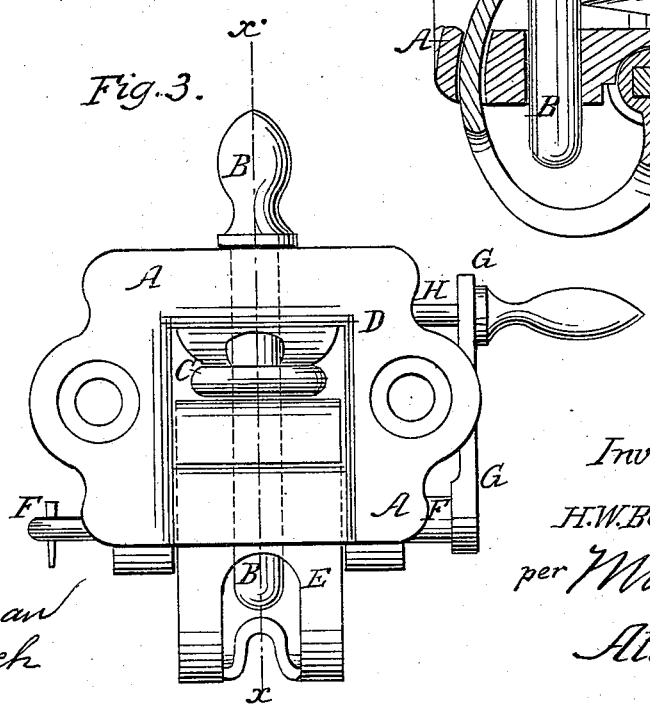
Witnesses.
Wm A Morgan
P. C. Dieterich
Inventor.
H. W. Boifeuillet
per Munn & Co
Attorneys

United States Patent Office.

H. W. BOIFEUILLET, OF SAVANNAH, GEORGIA.

*Letters Patent No. 85,359, dated December 29, 1868.*

IMPROVED CAR-COUPLING.

The Schedule referred to in these Letters Patent and making part of the same.

*To all whom it may concern:*

Be it known that I, H. W. BOIFEUILLET, of Savannah, in the county of Chatham, and State of Georgia, have invented a new and improved Car-Coupling; and I do hereby declare that the following is a full, clear, and exact description thereof, which will enable those skilled in the art to make and use the same, reference being had to the accompanying drawings, forming part of this specification, in which—

Figure 1 is a side view of my improved car-coupling.

Figure 2 is a vertical longitudinal section of the same, taken through the line $x\,x$, fig. 3.

Figure 3 is a front view of the same.

Similar letters of reference indicate corresponding parts.

My invention has for its object to furnish an improved car-coupling, which shall be so constructed and arranged as to be self-coupling, and so as to be adjustable, to support the link at any desired elevation, to enter the bumper of the adjacent car when the cars are run together; and It consists in the construction and combination of various parts of the coupling, as hereinafter more fully described.

A is the bumper, which is securely connected with draught-bar and frame of the car in the ordinary manner.

B is the coupling-pin, which passes down through the bumper-head A and through the link C, to couple the cars and sustain the draught-strain, in the ordinary manner.

D is a plate, the forward or upper edge of which is pivoted to the forward part of the upper side of the cavity of the bumper-head A, as shown in fig. 2.

The plate D is made of such a size that, when allowed to drop freely, its lower edge may strike against the lower side or part of the bumper-head, and thus be prevented from ever dropping into a vertical position, but which may be raised into a horizontal position, so as to lie along the upper side of the said bumper.

The plate D has an elongated hole formed through it for the pin B. By this construction, when the coupling-pin B and coupling-link C are removed, the plate D drops down until its rear or lower edge rests upon the lower side of the bumper A. If now the coupling-pin B is inserted in its place, its lower end will enter the elongated hole through the said plate, and rest upon the lower side of said hole. Then, as the cars are run together, the coupling-link of the adjacent car, as it enters the bumper-head A, will strike the plate D and raise it, allowing the pin B to drop through the link, securely coupling the cars.

E is a curved plate, the rear edge of which is pivoted to the rear part of the lower side of the bumper A, by means of the square shaft F, which passes through a square hole in said plate, and which works in bearings formed in or attached to said bumper A, so that the said plate E may be operated by operating the shaft F.

The forward part of the curved plate E passes up through a transverse slot in the forward part of the lower side of the bumper A, so that the link C may rest upon the upwardly-projecting edge of the said plate E, and be adjustably supported in proper position to enter the bumper-head of the adjacent car when the two cars are run together.

The middle part of the curved plate E is slotted longitudinally, as shown in figs. 2 and 3, so that it and the pin B cannot interfere with each other's working, should a long pin be used.

To one end of the square shaft F is rigidly attached an arm, G, projecting upward, and having a pawl or catch-arm, H, attached to its upper end, which takes hold of the teeth of the rack I, formed upon or attached to the upper part of the bumper A, in such a position as to be out of the way, so as to hold the curved plate E securely in any position into which it may be adjusted.

In the rear part of the cavity of the bumper-head A are formed recesses, one or more, to assist the curved plate E in holding the link C securely in the proper position to enter the bumper-head of the adjacent car when the cars are run together.

It should be observed that the forward edge of the lower side of the bumper A is cut away, or made shorter than the other sides, so that the said side, which is weakened by the transverse slot through which the curved plate E passes, may not be injured by the concussion when the cars are run together.

I claim as new, and desire to secure by Letters Patent—

The combination of the rack I, pawl or catch-arm H, arm G, and square shaft F, with the bumper-head A and curved plate E, substantially as herein shown and described, and for the purpose set forth.

The above specification of my invention signed by me, this 26th day of September, 1868.

H. W. BOIFEUILLET.

Witnesses:
 T. H. WILLIAMS,
 A. E. JONES,